United States Patent [19]

Sherly et al.

[11] Patent Number: 5,412,722

[45] Date of Patent: May 2, 1995

[54] ENCRYPTION KEY MANAGEMENT

[75] Inventors: Mark J. Sherly, Bartlett; Hans C. Sowa, Schaumburg, both of Ill.; Michelle M. Bray, Maple Grove, Minn.

[73] Assignee: Motorola, Inc., Schaumburg, Ill.

[21] Appl. No.: 114,528

[22] Filed: Aug. 31, 1993

[51] Int. Cl.6 .......................... H04L 9/14; H04B 7/204
[52] U.S. Cl. ............................................. 380/21; 380/49
[58] Field of Search ................................... 380/21, 49

[56] References Cited

U.S. PATENT DOCUMENTS

| | | | |
|---|---|---|---|
| 4,369,332 | 1/1983 | Campbell, Jr. | 380/21 |
| 4,800,590 | 1/1989 | Vaughan | 380/49 X |
| 5,150,408 | 9/1992 | Bright | 380/21 |
| 5,247,576 | 9/1993 | Bright | 380/21 |
| 5,285,496 | 2/1994 | Frank et al. | 380/49 X |
| 5,293,576 | 3/1994 | Mihm, Jr. et al. | 380/21 |
| 5,301,232 | 4/1994 | Mulford | 380/21 |
| 5,313,521 | 5/1994 | Torii et al. | 380/21 |
| 5,325,432 | 6/1994 | Gardeck et al. | 380/21 |
| 5,341,427 | 8/1994 | Hardy et al. | 380/21 |

*Primary Examiner*—Gilberto Barrón, Jr.
*Attorney, Agent, or Firm*—John W. Hayes

[57] ABSTRACT

A key management system permits a high degree of autonomous rekeying activity by communication units (105) in a secure communication system (100). Responsive to time reference information transmitted by a key management controller (101), the communication units (105) activate a designated key index at a predetermined activation time. If conditions so indicate, a communication unit may transmit a rekey request.

10 Claims, 3 Drawing Sheets

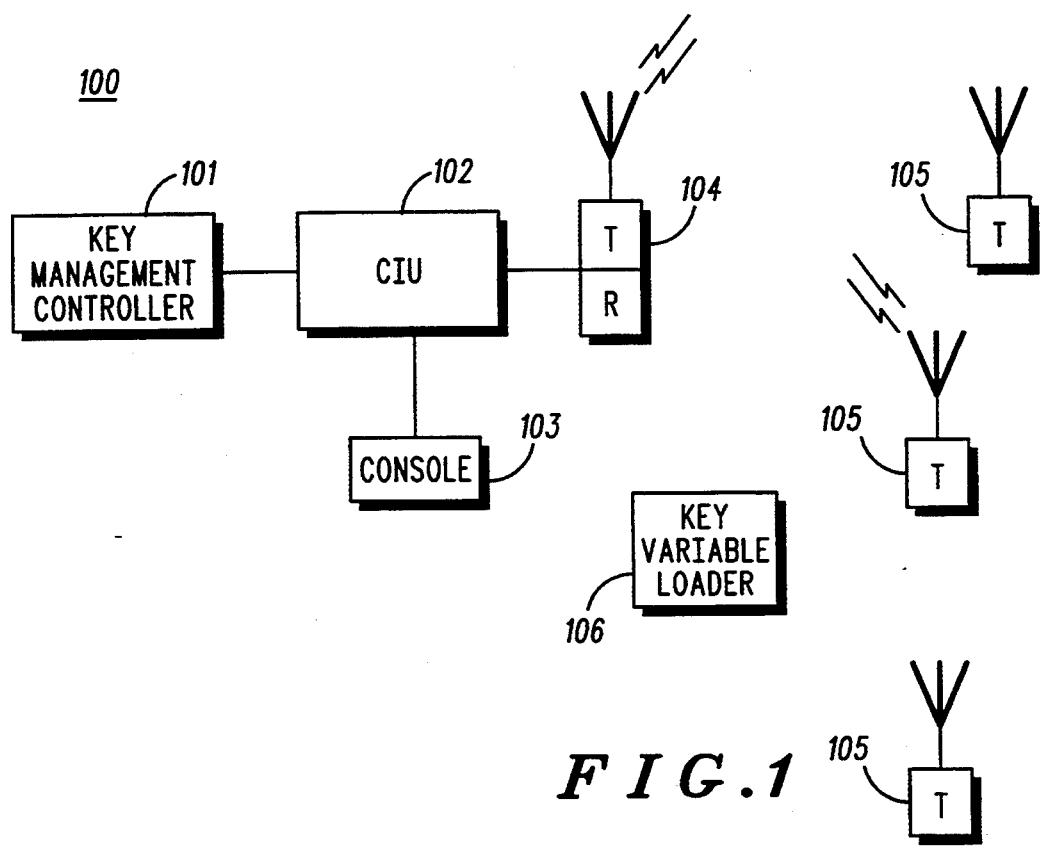

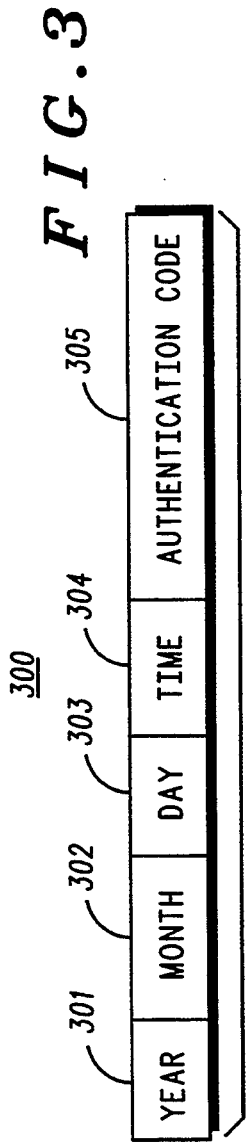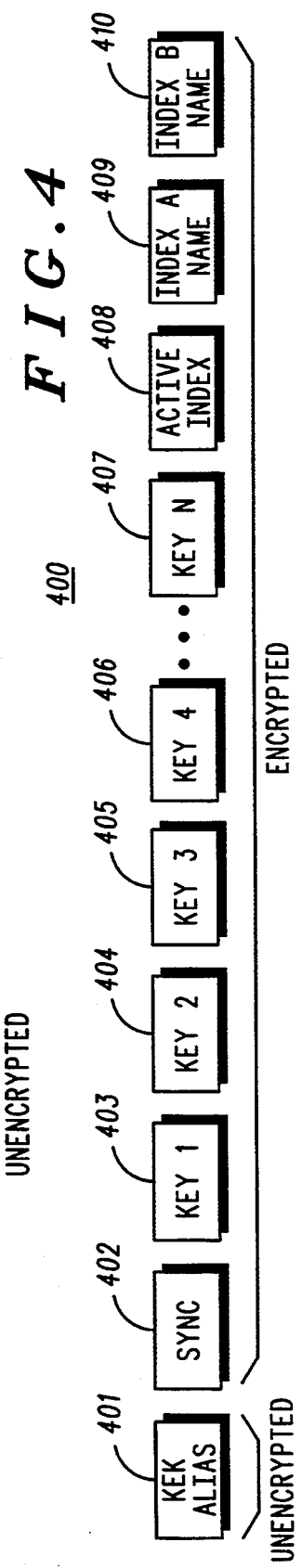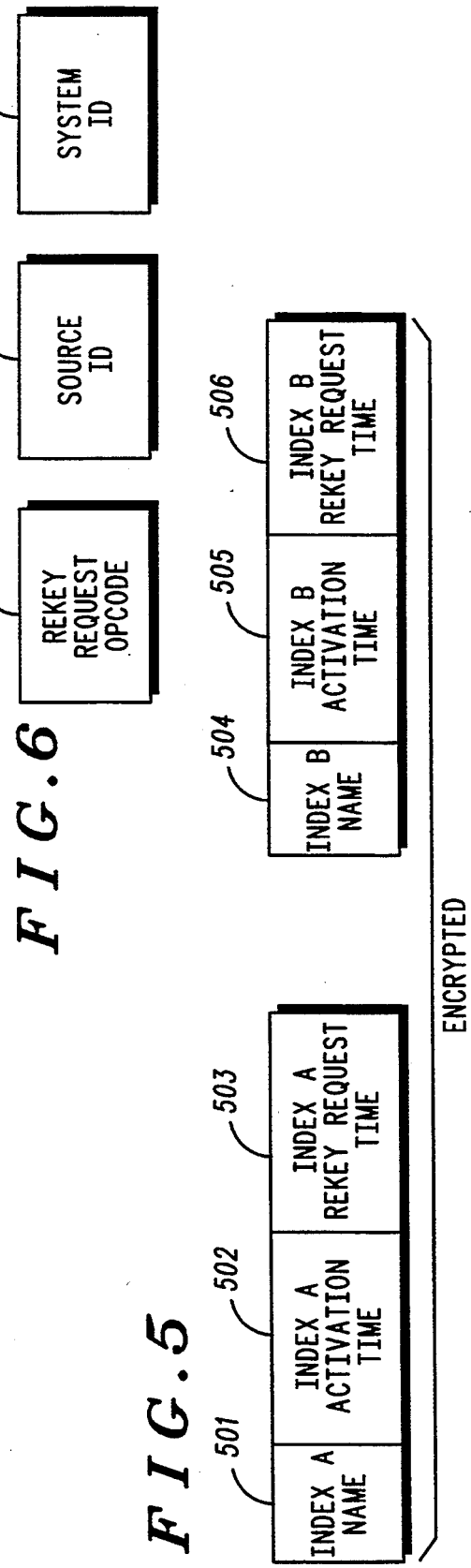

ENCRYPTION KEY MANAGEMENT

FIELD OF THE INVENTION

This invention relates generally to secure communication systems and in particular to encryption keys that allow information signals to be reversibly encrypted, and is more particularly directed toward encryption key management.

BACKGROUND OF THE INVENTION

A secure communication system relies on an encryption algorithm and an encryption key variable in order to encrypt a stream of data/voice being passed between two or more communication units. For the units to communicate properly, all units involved in the communication must share both the same encryption algorithm and the same encryption key variable. If either the encryption algorithm or the encryption key variable is different between the transmitting unit and a receiving unit, the communications will not be successful. By applying encryption techniques in this manner, it is possible to make it difficult for an adversary to monitor the communications being transmitted.

An encryption algorithm is a mathematical operation that pseudo-randomizes the information stream being transmitted. There are a variety of encryption algorithms available, and the choice of an algorithm for a particular application is generally based on the level of security desired. The encryption algorithm typically does not change very often in a system, and therefore an adversary may be able to determine what the algorithm is over a period of time. An effective encryption algorithm must also be capable of supporting a large number of encryption key variables to eliminate reliance solely on the strength and secrecy of the encryption algorithm. This prevents easy compromise of the system.

The encryption key variable is a number compatible with the encryption algorithm, that, when combined with the encryption algorithm, is used to encrypt a stream of voice or data information. Generally, the more encryption key variables an encryption algorithm can support, the more difficult it is to compromise the communication system. The system user typically chooses the encryption key variable. Over time, the encryption key variable may become known to an adversary in a number of ways; therefore, frequent changing of the encryption key variable reduces the risk of communication system compromise.

There are generally two categories of encryption key variables in a secure communication system. First, a traffic encryption key, or TEK, is used for the encryption of normal communication traffic, such as voice or data information signals. The second type is called a key encryption key (KEK), and is used to encrypt encryption key variables for transit, transmission or storage.

In most secure communication systems, encryption key variables are loaded into communication units by hand and individually, using a key variable loader. In large systems it can take a very long time to change the encryption key variables in all of the communication units, and, during these rekeying transition times there is an inability for all communication units to communicate with each other.

In more advanced secure communication systems, encryption key variables are stored and distributed electronically to communication units using a key management controller or KMC. This method provides for rapid distribution of encryption key variables to the communications units, reducing significantly the time it takes to load new encryption key variables into all communication units in a system. Nonetheless, communication among some of the communication units is still prevented until distribution of new keying material is completed. Furthermore, units that are powered down or out of range of KMC transmissions still would not receive new keys in a timely fashion.

Accordingly, a need arises for a method that ensures that communication units are operating with proper encryption key variables so that disruption of encrypted communication is minimized.

SUMMARY OF THE INVENTION

This need and others is satisfied by the method of the present invention, in which, for a secure communication system including a central key management controller and one or more communication units, a method is provided for said communication units to control an event. At the central key management controller, first data signals relating to time are transmitted from time to time, and second data signals relating to start time for the event are also transmitted. At one or more of the communication units, the first data signals are received and used to update a timing reference. The second data signals are also received, and start time information for the event is extracted. The start time information is compared to the timing reference, and, when the timing reference indicates that the start time has arrived, the event is started.

In the preferred embodiment, the central key management controller transmits day and date information from time to time. The central key management controller also sends rekeying material, along with scheduled activation times for these new keys. When the activation time arrives, the communication unit makes the new keys the active keys

BRIEF DESCRIPTION OF THE DRAWINGS

FIG. 1 is a block diagram of a secure communication system;

FIG. 2 is a representation of the way in which encryption key variables and associated information are stored in a communication unit;

FIG. 3 depicts the format in which information related to time is transmitted by the central key management controller;

FIG. 4 shows the general format used by the key management controller for transmitting new keys;

FIG. 5 illustrates the format in which index activation times and rekey request times are transmitted;

FIG. 6 shows a rekey request message originated by a communication unit; and

DESCRIPTION OF A PREFERRED EMBODIMENT

Figure 7:
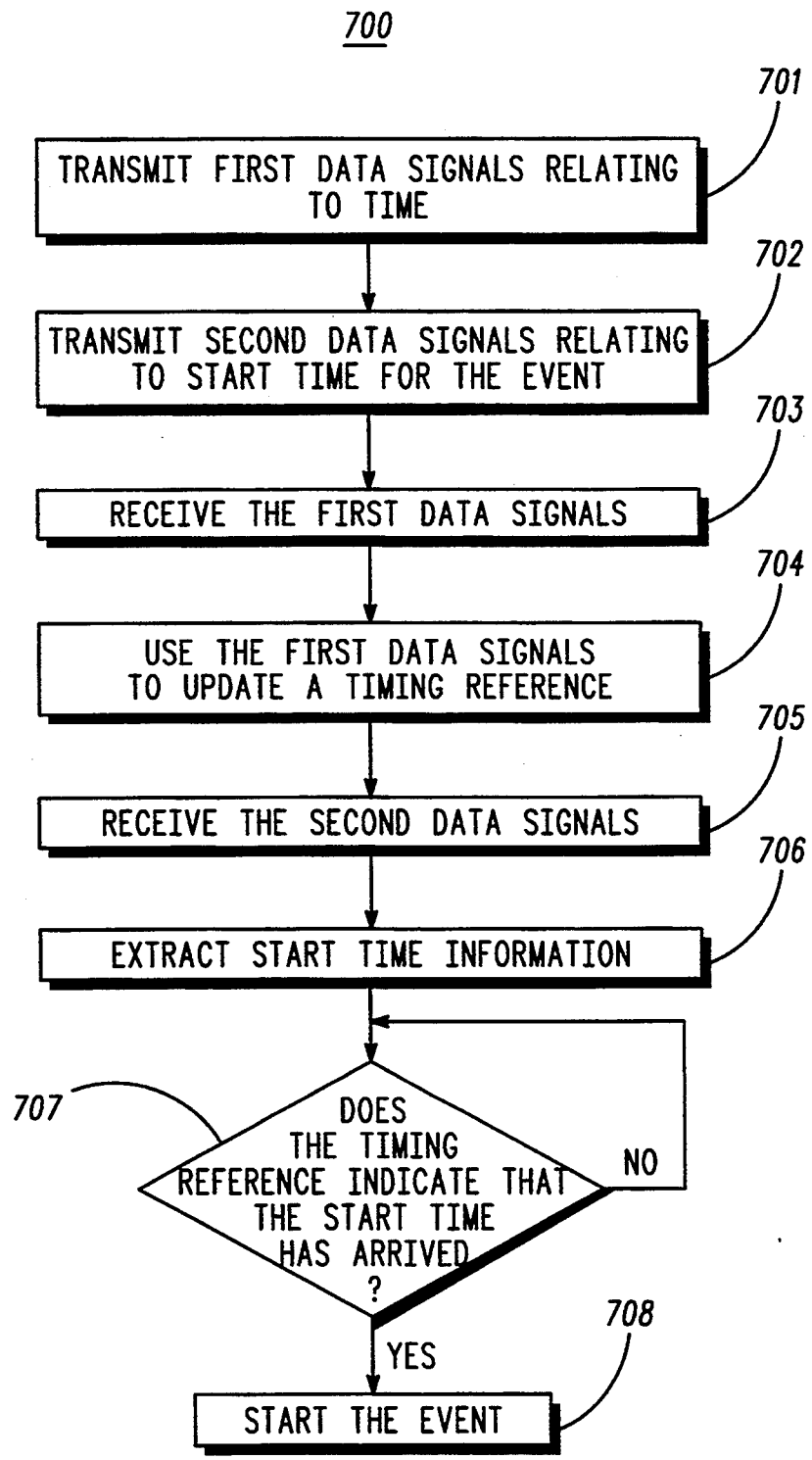
FIG. 7 is a flowchart of a method in accordance with the present invention.

The following paragraphs describe in detail a method devised by the inventors for communication units to control activation of encryption key indexes and, if necessary, to perform autonomous rekey requests in a fashion that avoids the shortcomings revealed in the foregoing discussion of the background art. By providing time activation information to the communication units, and by synchronizing those units properly, the units can perform key index changes and, requests for new keys independently of a central key management controller. This reduces significantly the dependence of the communication units on the key management controller to provide these functions, minimizes loss of secure communication during key changes, reduces the burden of these functions on the key management controller, and reduces data traffic on the system. This decentralization of functionality allows communication units to temporarily leave the service area (the area in which a communication system provides coverage for subscriber communication units), and still function effectively.

FIG. 1 is a block diagram of a secure communication system, as generally depicted by the numeral 100. The console interface unit (CIU) (102) and communication units (105) represent the system elements that contain identical encryption algorithms. The console (103) relies on the CIU (102) to encrypt and decrypt voice and data information signals both to and from the console operator in a secure communication system. Identical encryption key variables have been loaded into the communication units via either a key variable loader (106) or the key management controller (101). The key variable loader (106) relies on a direct hardware connection to a communication unit being keyed, while the key management controller (KMC) (101) is capable of transmitting keying material over the air. Several encryption key variables may be stored in each communication unit and organized into one active key index and one inactive key index.

In the voice communications example, audio is transmitted from the console (103) to the CIU (102), where it is encrypted, and then broadcast through a base station (104) to the communication units (105). The communication units may be mobile units, generally installed in a vehicle, or portable units, designed to be carried by a person. The communication units (105) then decrypt the encrypted voice information. For communication in the reverse direction, voice information is encrypted by a communication unit (105), then transmitted to other communication units (105) or to the base station (104). The base station (104) passes the encrypted information signals to the CIU (102), where they are decrypted and sent on to the console (103).

Encrypted data generated by the KMC (101) follows a similar path, with some noteworthy differences. For example, data generated and encrypted by the KMC (101) is passed to the CIU (102) where this encrypted signal is modulated into a format compatible with the rest of the system. The modulated signal is passed on to the base station (104), which transmits the signal to the communication units (105). The communication units (105) then attempt to decrypt the message, and, if successful, react according to the data. A communication unit (105) may also generate data, encrypting that data as required, and transmitting the data to other communication units (105) or back to the base station (104). The base station (104) will pass the data along to the CIU (102), which in turn routes it to the KMC (101) for processing, including decryption if necessary.

FIG. 2 is a representation of key indexes as they appear in the memory of a communication unit. In this example, there are two indexes, labelled INDEX A and INDEX B, and eight traffic encryption keys (TEKs) (207–214). TEKs are the key variables that are normally used to encrypt voice and data message traffic. Other types of key variables, as will be explained in more detail below, are used to encrypt rekeying transmissions. Each index has associated with it an Index Name (201, 202), an Index Activation Time (203, 204), a Rekey Request Time (205, 206), and several TEKs (207–214). For purposes of this example, Index A is the active index and Index B is the inactive index. This means that the TEKs in Index A (207, 209, 211, 213) are being utilized for secure communications by the communication units, while those TEKs in Index B (208, 210, 212, 214) are not in use. The TEKs in Index A (207, 209, 211, 213) are paired with the TEKs in Index B (208, 210, 212, 214), and each pair is associated with a particular communication channel. At the Index Activation Time for Index B (204), the TEKs in Index B will become active, and those in Index A will become inactive. When an index is inactive, new TEKs can be loaded, either by the key variable loader or the KMC, without causing a disruption in communication. In this way, loading of TEKs can be performed at non-critical times, and as much time as necessary can be taken for this TEK loading process, but TEKs can be quickly changed by simply changing the Active Index. In Index B, when the Rekey Request Time for Index B (206) arrives, the communication unit compares the time to the Rekey Request Time for Index A (205). If the Rekey Request Time for Index B (206) is later, then no action takes place. If the time is earlier, then the communication unit will perform an unsolicited Rekey Request some random time interval after the comparison operation. The Common Shadow Key or CSK (215), Unique Shadow Key or USK (216), and Key Loss Key or KLK (217), represent key encryption keys (KEKs) that are used to decrypt encrypted data sent to the communications units. The identical CSK (215) is shared by all units that have identical Index names (201, 202), Index Activation Times (203, 204), Rekey Request Times (205, 206) and TEKs (207–214) and is used to encrypt this information at the Key Management Controller (101), and decrypt this information at the communication units. The USK (216) is used to encrypt/decrypt Index Names (201, 202), Index Activation Times (203, 204), Rekey Request Times (205, 206) and TEKs (207–214) as well as the CSK (215), and is intended to be unique to each communication unit. All key encryption variables except the KLK (217) are stored in volatile memory. The KLK (217) is used to restore the USK (216) and all other secure communications information in the event that volatile memory is lost.

The time broadcast format used by the key management controller is shown in FIG. 3. This broadcast is important in order to ensure that all communication units have established a common time reference. It is required that the KMC have and maintain a clock of proper accuracy to provide the time information shown in FIG. 3. The information contained in this packet includes the Year (301), Month (302), Day (303), Time of Day (304) and authentication code (305).

FIG. 4 shows the general format used by the KMC in transmitting new keys to one or more communication units. Contained in this format are the KEK Alias (401), Encryption Synchronization (402), Encryption Key Variables (403–407), the Active Index (408), Index A Name (409) and Index B Name (410). The KEK Alias (401) is the only unencrypted portion and tells the communications unit which KEK to use to decrypt the remainder of the format. Without it, the radio does not know which key to choose, and would have to go through some complicated and lengthy process attempting all available keys. In the case of a CIU or KMC, this would be impractical. If the communication unit receives a transmission with a KEK Alias it does not have, it ignores the rest of the transmission. If the communications unit thinks it has a key with the alias mentioned, it attempts a decryption of the message using that KEK. If successful, the message is processed; if not, the message is unrecoverable. There is no correlation between the KEK Alias and the actual key used. Since the alias divulges nothing about the identity of the radio or the content of the key material, an adversary gains little knowledge from intercepting a KEK Alias (401).

Encryption Synchronization (402) provides the data necessary for the encryption algorithm to become synchronized and capable of decrypting the rest of the encrypted format. In this system, all encrypted messages contain sync information (402) and a KEK Alias (401). The encryption key variables (402–406) comprise all TEKs for all Key Indexes and KEKs being transmitted to receiving communication units. The Active Index (408) indicates which key index is active in the communication units, and this will be set to active as soon as it is received by the communication units. Index A Name (409) and Index B Name (410) are aliases given by the system operator for the respective indexes. These names can be displayed at the communication unit to provide the operator with information on what key indexes are available, and which is active.

FIG. 5 shows the general format used by the KMC in transmitting Index Activation and Rekey Request Times to the communication units. The Index A Name (501) provides an alias for Key Index A. Index A Activation Time (502) provides the time at which Index A becomes active. Index A Rekey Request Time (503) provides the time the communication unit determines whether to perform a Rekey Request. An authentication code (not shown) is also associated with the index, and is used to ensure that the information transmitted is not being generated by an adversary trying to "spoof" the system (disrupt the system by retransmitting intercepted encrypted traffic). The same information (504–506) is also transmitted for Index B. This information is encrypted in order to protect against attack by an adversary.

When the communication unit receives the unencrypted time broadcast from the KMC in FIG. 3, it compares this information with activation time information previously sent in encrypted form by the KMC in FIG. 5. If the time broadcast is greater than or equal to the activation time, and the authentication code in the time broadcast matches the authentication code of the activation time, the activation will be performed. If the authentication code in the time broadcast does not match the activation time authentication code, the communication unit will ignore the KMC time broadcast and not perform the activation. In this case, it is assumed that an adversary is attempting to disrupt communications in the system by causing the communication units to switch indexes.

FIG. 6 depicts a rekey request message originated by a communication unit. The Rekey Request op code (601) tells the destination KMC that a particular communication unit requires a Rekey. The Source ID (602) tells the KMC which communication unit is requesting the rekey so that the proper key material can be returned. The Destination ID (603) tells what KMC the communication unit is affiliated with. If a receiving KMC has the communication unit resident in its database, then a rekey can be initiated. If not, the KMC must determine whether to ignore the request or attempt a contact of the home KMC for remote delivery of key material.

FIG. 7 is a flowchart of a method in accordance with the present invention, in which one or more communication units may control an event. In block 701, a central key management controller transmits first data signals relating to time. In the preferred embodiment, these time-related signals comprise time-of-day and date information, coupled with an authentication code. In the next step shown (702), the central key management controller also transmits second data signals relating to start time for the event. These second data signals are included in rekeying information transmitted to the communication units by the key management controller.

At least one of the communication units receives the first data signals (block 703), and uses this transmitted time-related information to update a timing reference (block 704). In practice, updating a timing reference includes updating a counter internal to the communication unit that tracks time-of-day. In the next step (705), the communication unit receives the second data signals transmitted by the key management controller, and extracts start time information (block 706). Of course, the start time information is included with rekeying material transmitted by the KMC, as discussed previously, including key index names, activation times, rekey request times, and new traffic keys.

The communication unit compares the timing reference to the start time information in the second data signals (block 707), and, if the start time has arrived, starts the event (block 708). Of course, in the preferred embodiment, the event comprises the activation of the new key index.

The method steps described above are easily extendable to the case where the communication unit compares the time and date of the currently active key index with the time and date of the index designated to become active. If the time and date information associated with the currently active index happens to be more recent than the time and date of the designated index, the communication unit transmits a rekey request message.

The method disclosed in the preceding sections permits communication units to perform key index activation independent of a specific activation command transmitted by a KMC, or, if appropriate, to transmit a rekey request message. This degree of autonomous activity ensures that communication disruption is minimized during rekeying events, while limiting the rekeying data loading of a typical system.

What is claimed is:

1. In a secure communication system including a central key management controller and one or more communication units, a method for said communication units to control an event, the method comprising the steps of:

at the central key management controller:
        (a) transmitting, from time to time, first data signals relating to time;
        (b) transmitting second data signals relating to start time for the event;
    at said one or more communication units:
        (c) receiving the first data signals;

(d) using the first data signals to update a timing reference;
(e) receiving the second data signals;
(f) extracting start time information from the second data signals;
(g) comparing the start time information to the timing reference; and, when the timing reference indicates that the start time has arrived
(h) starting the event.

2. The method in accordance with claim 1, wherein the step (a) of transmitting, from time to time, first data signals relating to time includes the step of transmitting time-of-day and date information.

3. The method in accordance with claim 1, wherein the step (a) of transmitting, from time to time, first data signals relating to time includes the step of sending a transmitted authentication code.

4. The method in accordance with claim 3, wherein the step (d) of using the first data signals to update a timing reference includes the step of comparing the transmitted authentication code with a stored authentication code.

5. The method in accordance with claim 1, wherein the step (b) of transmitting second data signals relating to start time for the event includes the step of transmitting rekeying information.

6. The method in accordance with claim 5, wherein the step (b) of transmitting second data signals relating to start time for the event further includes the steps of:
(b1) encrypting the data signals relating to start time for the event;
(b2) encrypting the rekeying information.

7. The method in accordance with claim 6, wherein the step (f) of extracting start time information from the second data signals includes the step of decrypting the second data signals.

8. The method in accordance with claim 1, wherein said one or more communication units includes a plurality of key indexes that store encryption keys, and the step (h) of starting the event includes the step of designating one of the plurality of key indexes as an active key index.

9. The method in accordance with claim 8, wherein the step (b) of transmitting second data signals relating to start time for the event further includes the step of transmitting new encryption keys designated for storage in one of the plurality of key indexes.

10. In a secure communication system including a central key management controller and one or more communication units, wherein each of said one or more communication units includes:
(i) a plurality of key indexes, including a currently active index, that store encryption keys;
(ii) information associated with each one of the plurality of key indexes, the information including:
(1) a key index name;
(2) a time and date;
(3) a rekey request time;
a method for said one or more communication units to control activation of one of the plurality of key indexes, the method comprising the steps of:
at the key management controller:
(a) transmitting, from time to time, time-of-day and date signals and an associated authentication code;
(b) transmitting new encryption keys for storage in a designated one of the plurality of key indexes, along with an activation time for the designated one of the plurality of key indexes;
at said one or more communication units:
(c) updating a timing reference using the time-of-day and date signals;
(d) comparing the activation time to the timing reference; and, when the timing reference indicates that the activation time has arrived
(e) comparing the time and date of the currently active index to the time and date of the designated index; and, when the time and date of the currently active index is earlier than the time and date of the designated index
(f) making the designated index the currently active index; otherwise
(g) transmitting a rekey request message.

* * * * *